Figure 1:
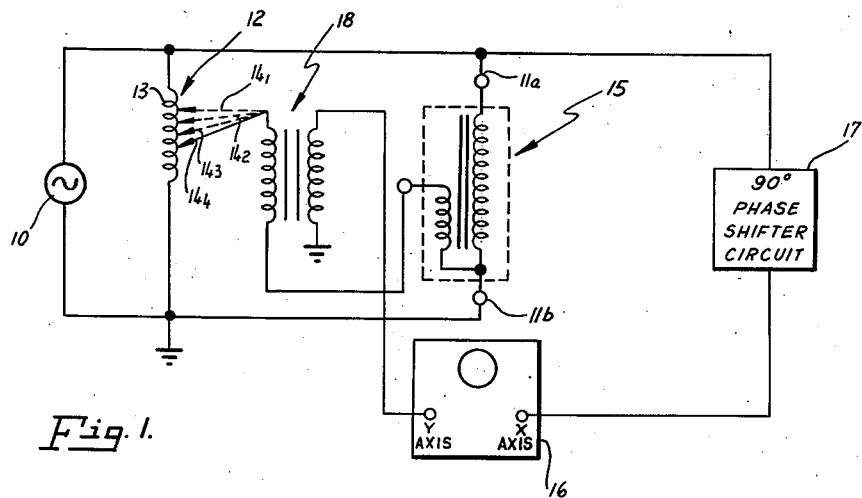

Oct. 1, 1957  E. FINE  2,808,561
PRECISION NULL DETECTOR CIRCUIT
Filed Jan. 20, 1956

EDWIN FINE,
INVENTOR

ATTORNEY

United States Patent Office 2,808,561
Patented Oct. 1, 1957

2,808,561

PRECISION NULL DETECTOR CIRCUIT

Edwin Fine, Los Angeles, Calif., assignor to Hughes Aircraft Company, Culver City, Calif., a corporation of Delaware Application January 20, 1956, Serial No. 560,923

1 Claim. (Cl. 324—55)

The present invention realtes to null detector circuits and more particularly to a null detector circuit for accurately calibrating and testing electrical components.

A null detector circuit is a device which indicates when electrical current is zero or at a minimum value. Consequently, null detector circuits have frequently been adapted to calibrate and test certain types of electrical components, such as transformers, alternating-current resolvers, autosyns, selsyns and synchros. For example, a null detector circuit may be used to determine the turns ratio of a step-down transformer.

In such a test, a reference voltage is usually applied to the primary winding of the step-down transformer as well as to a voltage divider circuit. The output voltage produced by the secondary winding of the transformer is then compared to the different output voltages of the voltage divider circuit until the two output voltages are equal, that is, until the null detector circuit indicates that the current flowing between the secondary winding and the voltage divider circuit is zero. The turns ratio of the transformer is obtained by dividing the value of the reference voltage by the value of the output voltage of the divider circuit, this being equivalent to dividing the voltage across the primary winding by the voltage across the secondary winding.

One of the principal limitations of null detector circuits found in the prior art has been their lack of sensitivity in detecting small changes of voltage or current around the null point. Heretofore, for example, prior art null detectors were limited to sensitivities of approximately 0.0001 volt. However, because modern day requirements in the electronics field have made it necessary to use electrical components having extremely small tolerance ratings, a sensitivity, in the neighborhood of 0.0001 volt has proven to be inadequate for calibrating and testing these electrical components.

It is, therefore, an object of the present invention to provide a null detector circuit for accurately calibrating and testing electrical components.

It is another object of the present invention to provide a null detector circuit that is highly sensitive to small changes of current and voltage.

It is a further object of the present invention to provide a null detector circuit that can detect with precision small changes of current and voltage around the null point.

The present invention overcomes the above as well as other limitations of null detector circuits found in the prior art by providing a null detector circuit that is extremely sensitive to small changes of current and voltage. More particularly, according to an embodiment of the present invention, the reference voltage is first shifted in phase by 90° and then applied to one of the two input terminals of an oscilloscope. The difference voltage between the electrical component undergoing test or calibration and the voltage divider circuit is applied to the other input terminal of the oscilloscope, thereby obtaining a Lissajous figure on the oscilloscope screen.

When the output voltages of the electrical component and the divider circuit are substantially equal, that is, when the null detector circuit is at a null point, the difference voltage is substantially 90° out of phase with the reference voltage and the Lissajous pattern is substantially a straight line. Any small changes in the difference voltage causes a deviation from the straight line pattern which is easy to detect. It has been estimated, for example, that the null detector circuit of the present invention is sensitive enough to detect changes in the difference voltage in the order of 0.0000001 volt.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Figure 2:
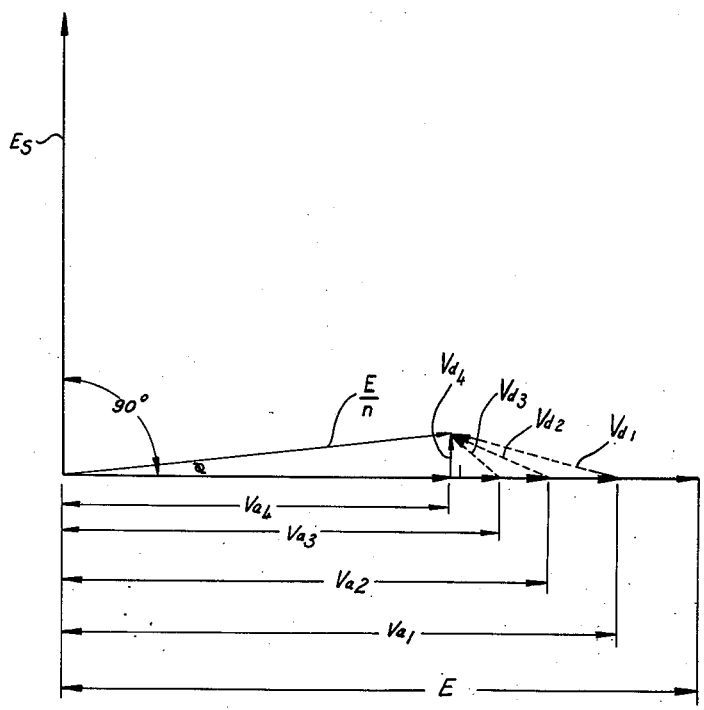

Fig. 1 is a schematic circuit, partly in block form, of the null detector circuit of the present invention; and Fig. 2 is a vector diagram illustrating the relative magnitudes and phase relationships of voltages developed in the circuit of Fig. 1.

Referring now to the drawings, there is shown in Fig. 1 a null detector circuit, according to the present invention, that is used either to calibrate certain types of electrical components or to test such components for their rated values with a relatively high degree of precision. As shown in the figure, the null detector circuit comprises a suitable source of alternating current voltage 10, a pair of terminals 11a and 11b between which the component to be calibrated or tested is electrically connected, and a precision auto-transformer, generally designated 12, having a winding 13 electrically connected across both source 10 and terminals 11a and 11b, and a movable center-tap arm 14.

In a preferred type of auto-transformer, the transformer output is given as the ratio of the output voltage developed by the transformer to the total voltage applied to the transformer. Thus, if the transformer arm points to 0.5 on the transformer scale, the output voltage developed by the transformer is exactly 0.5 of the input voltage.

In order to facilitate the description of the present invention and its mode of operation, a specific type of electrical component has been connected between terminals 11a and 11b, namely, a step-down transformer 15, which is to be tested for its turn ratio. As shown in the figure, the primary winding of transformer 15 is connected between terminals 11a and 11b and one end of the secondary winding is also connected to terminal 11b.

The null detector circuit also includes an oscilloscope 16 having horizontal and vertical input terminals marked X axis and Y axis, respectively, as shown in the figure. A 90° phase shifter circuit 17 is electrically connected between the horizontal input terminal of oscilloscope 16 and terminal 11a, the input end of the phase shifter circuit being connected to terminal 11a and the output end of the phase shifter circuit being connected to the horizontal input terminal. The vertical input terminal of oscilloscope 16 is electrically coupled by means of a bridging transformer, generally designated 18, to auto-transformer 12 and step-down transformer 15. More specifically, the vertical input terminal of oscilloscope 16 is connected to one end of the secondary winding of bridging transformer 18, the other end of the secondary winding being connected to ground. Moreover, one end of the primary winding of bridging transformer 18 is electrically connected to center-tap arm 14 of auto-transformer 12 and the other end of the primary winding of the bridging transformer is electrically connected to the other end of the secondary winding of step-down transformer 15.

In operation, source 10 applies an alternating-current voltage E across auto-transformer 12 and terminals 11a and 11b. Consequently, voltage E is applied across the primary winding of step-down transformer 15, the voltage produced across the secondary winding of transformer 15 being $$\frac{E}{n}$$

where $n$ is the turns ratio of the step-down transformer. In response to voltage E, auto-transformer 12 produces an alternating current output voltage $V_a$ whose magnitude is determined by the location along auto-transformer winding 13 of the point of electrical contact between center-tap arm 14 and the winding.

Voltages $V_a$ and $$\frac{E}{n}$$

are applied to the two ends of the primary winding of bridging transformer 18 and as a result, a different voltage $V_d$ is developed across the primary winding, the magnitude of the voltage $V_d$ being equal to the vector difference between voltages $V_a$ and $$\frac{E}{n}$$

Voltage $V_d$ is induced in the secondary winding of bridging transformer 18 and is, thereby, applied to the vertical input terminal of oscilloscope 16.

Voltage E is also applied to phase shifter circuit 17 which shifts the phase of voltage E by 90° to produce phase shifted voltage $E_s$ which is applied to the horizontal input terminal of oscilloscope 16. A phase shifter circuit that may be used in the circuit of the present invention is shown and described on pages 112 through 115 of an article entitled "Wideband phase shift networks" by R. B. Dome, in Electronics, December 1946.

The application of voltages $V_d$ and $E_s$ to oscilloscope 16 causes a Lissajous figure to appear on the oscilloscope screen, the Lissajous figure being that of an ellipse. However, by appropriately varying the amplitude of voltage $V_a$, the ellipse will gradually collapse into a straight line, as is well known, thereby indicating that the amplitude of voltage $V_d$ is at a minimum, that is, that a null point has been reached. When the amplitude of voltage $V_d$ is a minimum, that is, when the Lissajous figure on the oscilloscope screen is a straight line, voltage $V_a$ is substantially equal to voltage $$\frac{E}{n}$$

Accordingly, the turns ratio $n$ of step-down transformer 15 may be obtained by calculating the ratio of voltage E to voltage $V_a$. In other words, since $$V_a = \frac{E}{n} \quad (1)$$

$$n = \frac{E}{V_a} \quad (2)$$

By using the precision auto-transformer referred to above, the ratio of E to $V_a$ or of $V_a$ to E may be obtained directly from the transformer scale. Hence, this type of auto-transformer is preferred.

The amplitude of voltage $V_a$ may be varied by moving center-tap arm 14 along winding 13 of auto-transformer 12, as indicated by the several center-tap arm positions $14_1$, $14_2$, $14_3$ and $14_4$ shown in Fig. 1. Moreover, it should be noted that the difference between voltages $V_a$ and $$\frac{E}{n}$$

at the null point or, stated differently, the existence of voltage $V_d$ at the null point is due solely to small differences between auto-transformer 12 and step-down transformer 15 in internal resistance, leakage inductance and distributed capacitance which introduce a small phase difference between voltages $V_a$ and $$\frac{E}{n}$$

It should be obvious, therefore, that if ideal auto-transformer and step-down transformer elements were available, voltage $V_d$ would be reduced to zero at the null point.

For a better understanding of the operation of the null detector circuit of the present invention, reference is made to the vector diagram shown in Fig. 2 wherein the vectors indicate the relative magnitudes and phase relationships of voltages developed at various points in the circuit of Fig. 1. Thus, the voltage generated by source 10 is designated E, the voltage produced by phase shifter circuit 17 is designated $E_s$, the voltage produced by auto-transformer 12 is designated $V_a$, the voltage developed across the secondary winding of step-down transformer 15 is designated $$\frac{E}{n}$$

and the difference between voltages $V_a$ and $$\frac{E}{n}$$

developed across the primary winding of bridging transformer 18, is designated $V_d$. As seen in Fig. 2, voltage $E_s$ is 90° out of phase with voltage E and voltage $$\frac{E}{n}$$

is out of phase with voltage $V_a$ by the angle $\phi$.

It will also be seen from Fig. 2 that as center-tap arm 14 is moved along winding 13, as indicated by center-tap arm positions $14_1$, $14_2$, $14_3$ and $14_4$, the magnitude of voltage $V_a$ varies in the manner indicated by designations $V_{a_1}$, $V_{a_2}$, $V_{a_3}$ and $V_{a_4}$ and that, as a result, the magnitude and phase of voltage $V_d$ correspondingly varies as indicated by designations $V_{d_1}$, $V_{d_2}$, $V_{d_3}$ and $V_{d_4}$. Subscripts 1, 2, 3 and 4 relate voltages $V_a$ and $V_d$ to the different positions of center-tap arm 14 along winding 13.

Voltage vector $V_{d_4}$ is perpendicular to or 90° out of phase with voltage vector E and, therefore, is parallel to or in phase with voltage vector $E_s$. Accordingly, when voltage $V_d$ is represented by vector $V_{d_4}$, the Lissajous pattern on the oscilloscope screen is that of a straight line, thereby indicating the null point, that is, that the magnitude of voltage $V_d$ is a minimum. At this point, voltage $V_a$ is equal to $$\frac{E}{n}$$

except for the small difference introduced by the small phase angle $\phi$, as previously mentioned. Hence, at the null point, the turns ratio $n$ of step-down transformer 15 may be obtained in the manner previously explained.

It should be noted that the subject null detector circuit is not limited in its use to any particular frequency but, rather, may successfully be utilized over a wide range of frequencies. Thus, the present invention may be used to calibrate and test electrical components at 60 cycles per second as well as at 10,000 cycles per second.

What is claimed as new is:

A precision null detector circuit for calibrating and testing an electrical component by means of Lissajous figures presented on an oscilloscope screen, said component, during said calibration and test, being electrically connected across a source of alternating-current voltage and, in response thereto, producing a first output voltage, said null detector circuit comprising: a precision variable voltage divider element electrically connected across the source, said voltage divider element producing a second output voltage of selected amplitude; means electrically connected between said voltage divider element and the electrical component for producing a third output voltage equal to the instantaneous difference between the first output voltage and said second output voltage, said means being connected to the oscilloscope for applying said third output voltage thereto; and a phase shifter circuit electrically connected between the source and the oscilloscope for applying a fourth output voltage to the oscilloscope that is ninety degrees out of phase with the alternating-current voltage produced by the source, whereby a Lissajous figure is presented on the oscilloscope screen that indicates, when the amplitude of said second output voltage is correctly selected, that the first output voltage is equal to said second output voltage.

References Cited in the file of this patent

Knowles: "General Electric Review," November 1951.